Patented Nov. 18, 1930

1,782,267

UNITED STATES PATENT OFFICE

WILLIAM BURNS LOGAN, OF DE QUINCY, LOUISIANA, ASSIGNOR, BY MESNE ASSIGNMENTS, TO THE NEWPORT COMPANY, A CORPORATION OF DELAWARE

REMOVING COLOR FROM ROSIN

No Drawing. Application filed August 2, 1928. Serial No. 297,110.

The present invention relates to the treatment of rosin for improving the color thereof.

As is well known, rosin is graded by color, lighter colored rosin being more desirable than dark colored rosin, and fetching a better price in the market. There are two principal kinds of rosin, namely gum rosin and wood rosin, the former being the product left after distilling the turpentine out of the crude gum, and the latter being the rosin obtained from dead wood, such as pine stumps "light wood" and the like. The present invention is applicable to both of these kinds of rosin, and has been found to give very satisfactory results with both kinds.

Ordinary rosin consists essentially of abietic acid or its anhydride, and the color of rosin is in large part due to the presence of "color bodies" as the term is used in the art, and according to some authorities these color bodies may consist of oxidation products of abietic acid, and at any event it is well known that the color bodies are substances found in rosin, which substances act chemically as acids toward alkalies, so that when the rosin is treated with an alkali to form a soap, both the pure rosin and the color bodies are reacted upon by the alkali, and form soluble products, both of which go into solution.

The object of my invention is to successfully remove the color bodies from the rosin, without injuring the rosin, and without causing excessive losses during the purifying operation and without giving an undesirable crystallizing tendency to the rosin, which crystallizing tendency would be objectionable for certain of the uses of rosin.

In accordance with the present invention, I have found that a halide compound may be caused to combine with the color bodies in the rosin, while the rosin is in solution in a suitable solvent such as petroleum naphtha, or other relatively light petroleum distillates, producing thereby what is believed to be an addition product of the said color bodies with the halogen compounds, this addition product being far less soluble in many of the solvents of rosin, than is the original color body. In this way the color body is precipitated and can be removed from the solution by filtration or other appropriate methods, leaving the solution of a light colored rosin, from which the rosin can be secured by distilling off the solvent.

I give the following specific example, but it is to be understood that the example is given for the purpose of illustration and not as restricting the invention thereto.

Starting with a solution of rosin in such a solvent as petroleum naphtha (a 10% solution by weight being satisfactory), a solution of stannic chloride in petroleum naphtha is added thereto, in amount sufficient to combine with and precipitate a large proportion at least of the color bodies. Using a 10% solution of the rosin in naphtha, one may add about 1 to 10 pounds, (say 5 pounds) of stannic chloride in the form of a solution of one pound of anhydrous stannic chloride to each gallon of the naphtha used, per 100 pounds of rosin. The solution of the stannic chloride can be added to the solution of rosin in a small stream, preferably while well agitating the mass. The stannic chloride has a preferential action on the color bodies, rather than on the rosin, thereby forming a product which is not easily soluble in the petroleum naphtha used. When the precipitation is complete (within a few minutes after the addition of the stannic chloride solution) the stirring can be continued for a few minutes, and the entire liquid can then be filtered or passed through a suitable centrifugal separator, or otherwise separated to take out the precipitated matter. The filtrate consisting of a relatively light colored solution of rosin (i. e. much lighter in color than the original rosin solution) is found to still contain some small amount of stannic chloride, perhaps in combination with some of the abietic acid of the rosin. To the solution of the light rosin in petroleum naphtha, there is then added sufficient water to decompose this, and the mass is well agitated to produce a good mixture of the water with the solution. The amount of water can vary between wide limits, but about 5 to 50% (based on the volume of the solution) is usualy a satisfactory amount. After agitating and settling, the excess of water can be drawn off. The water can be at room temperature or warm water, say at 70° C., can be used.

The result of this treatment is precipitation of a tin compound, which is thought to be stannic acid. This tin compound is generally held in suspension in the water layer and is decanted off therewith. Any remaining residue may be removed by filtration. The petroleum naphtha is then evaporated off the purified rosin, leaving the light colored rosin. In operating by the above method upon wood rosin of the grade "F F" (which is a ruby-red color) and using about 5 pounds of stannic chloride per 100 pounds of the rosin, I have been able to secure a grade "M" rosin, this latter being a much lighter colored rosin than the FF, and being accordingly salable at a much higher price per pound.

The decomposition of the tin compound of abietic acid in the solution after filtration of the color body, can be carried out in numerous other methods besides the one above given, and in general any suitable method for recovery of the tin can be employed.

I have above referred to the use of stannic chloride as the precipitating agent, but other chlorides can be used if desired, such as stannous chloride and aluminum chloride, these being suitable for use with naphtha, and capable of producing a substantial improvement in the color of the rosin.

It will be obvious that instead of the chlorides, the other halides can be used, although they are more expensive. The compounds formed when these halides react with the light colored rosin acids are "light colored" as distinguished from the products formed by using ferric chloride which is yellowish brown, cupric chloride which is green, etc. It will be obvious that the halides which form strongly colored products from the colorless or light colored rosin acids would be less suitable, in a decolorizing process. Stannic chloride, when pure, is a colorless or water-white liquid, and does not darken the rosin, and this is the preferred material to employ.

Regarding the petroleum naphtha, this is given merely as an illustration of a suitable solvent, and it seems unnecessary to state that many other solvents for rosin are already well known in the industry.

It may be noted that the substances which I have used successfully in the removal of the color bodies are themselves either white or colorless, or at least have a very light color. Certain chlorides of a dark color, if added to the rosin solution would considerably darken the color. Accordingly I do not recommend dark colored chlorides such as copper chloride, iron chloride, chromium chloride and the like.

I claim:—

1. A process of improving the color of rosin which comprises the herein described steps of treating a solution of rosin with a light colored metal halide capable of forming an insoluble compound with the color bodies in the rosin and separating the precipitate from the solution of rosin.

2. A process of improving the color of rosin which comprises the herein described steps of treating a solution of rosin with a light colored metal halide capable of forming an insoluble compound with the color bodies in the rosin and separating the precipitate from the solution of rosin, and thereafter decomposing the halide compound left in the rosin solution.

3. A process of improving the color of rosin which comprises the herein described steps of treating a solution of rosin with stannic chloride to form an insoluble compound with the color bodies in the rosin and separating the precipitate from the solution of rosin.

4. A process of improving the color of rosin which comprises the herein described steps of treating a solution of rosin with a solution of a light colored metal halide, in a rosin solvent, such halide being capable of forming an insoluble compound with the color bodies in the rosin, and separating the precipitate from the solution of rosin.

5. A process which comprises adding to a solution of a colored rosin in light petroleum hydrocarbon solvent, a solution of stannic chloride in a rosin solvent miscible with such rosin solution, separating the precipitated compound of color bodies from the remaining solution of rosin, which solution is lighter in color than the original solution.

6. A process which comprises adding to a solution of a colored rosin in light petroleum hydrocarbon solvent, a solution of stannic chloride in a rosin solvent miscible with such rosin solution, separating the precipitated compound of color bodies from the remaining solution of rosin, which solution is lighter in color than the original solution, treating the remaining solution with water to decompose stannic chloride compound and separating the precipitated tin compound, and thereafter removing the lighter colored rosin from the solution.

7. A process of improving the color of rosin which comprises the herein described steps of treating a solution of rosin with a light colored metal chloride capable of forming an insoluble compound with the color bodies in the rosin, and separating the precipitate from the solution of rosin.

8. A process of improving the color of rosin which comprises the herein described steps of treating a solution of rosin with a compound selected from the group consisting of stannic halides, stannous halides and aluminum halides, separating the precipitate from the solution of rosin, and thereafter decomposing the halide compound left in the rosin solution.

9. A process of improving the color of rosin which comprises the herein described steps of treating a solution of rosin with a solution of a compound selected from the group consisting of stannic halide, stannous halide and aluminum halide, said compound being dissolved in a liquid which is a solvent for rosin, and separating the precipitate from the solution of rosin.

10. A process of improving the color of rosin which comprises the herein described steps of treating a solution of rosin with a compound selected from the group consisting of stannic chloride, stannous chloride and aluminum chloride, and separating the precipitate from the solution of rosin.

11. A process of improving the color of rosin which comprises the herein described steps of treating a solution of rosin in a light petroleum hydrocarbon solvent with a compound selected from the group consisting of stannic chloride, stannous chloride and aluminum chloride, and separating the precipitate from the solution of rosin.

WILLIAM BURNS LOGAN.